United States Patent Office 3,129,771
Patented Apr. 21, 1964

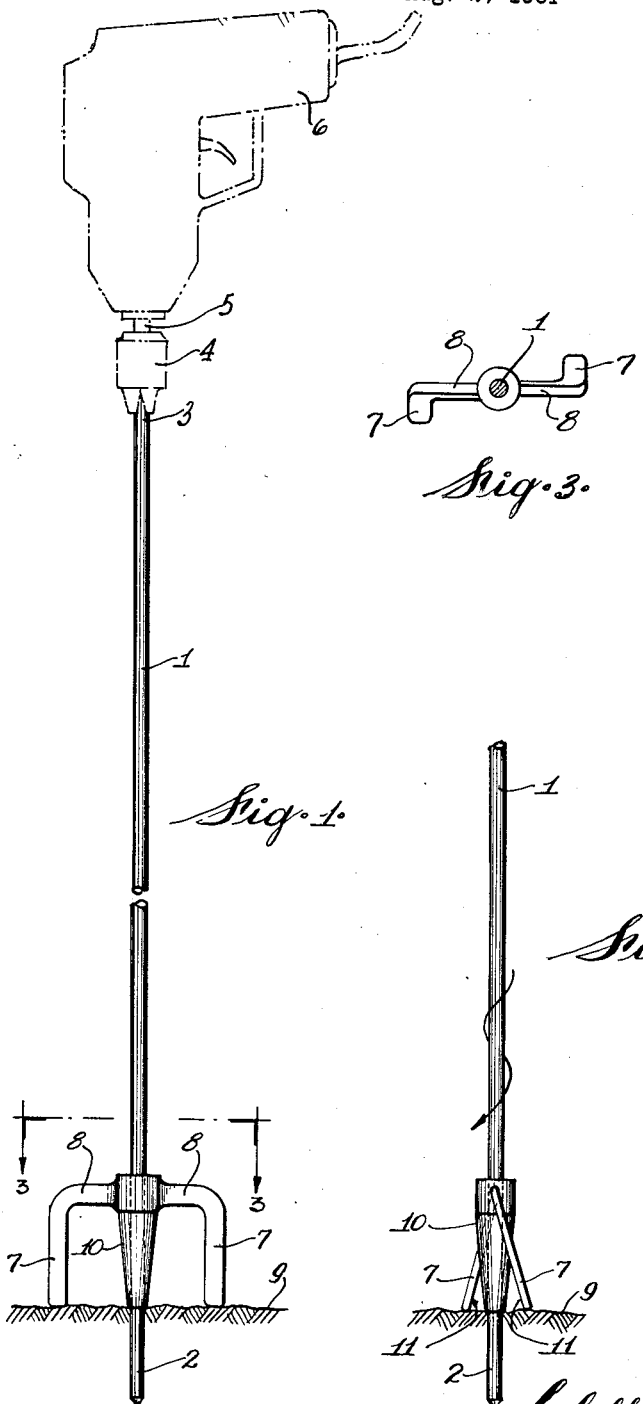

3,129,771
CULTIVATING TOOL
Clifford G. Lidstone, 356 Anthony St., Sudbury,
Ontario, Canada
Filed Aug. 2, 1961, Ser. No. 128,769
2 Claims. (Cl. 172—25)

This invention relates to cultivating tools.

Many types of cultivating tools for individual manual operation have heretofore been proposed. Such tools frequently fail in providing completely satisfactory service. For instance, the removal and destruction of weeds is not accomplished to a desired degree. Cultivation of plants in close proximity thereto is not possible without injury to the plant. Breaking up of hard soils such as dry clay, is difficult.

It is an object of this invention to provide a cultivating tool of rotary operating type which is adapted to be driven at relatively high speed by power means, which readily breaks up soils of substantially all types, which penetrates the earth to any desired degree from a shallow to a greater depth, which may be selectively and restrictively applied to required soil areas, and which is adapted to comminute weeds and their root systems for substantially complete destruction thereof.

The invention will be described with reference to the accompanying drawing, in which—

FIGURE 1 is a side elevation of a tool in accordance with the invention,

FIGURE 2 is a partial elevation from another side of the tool, and

FIGURE 3 is a sectional plan view.

In the drawing, 1 is a shank which may comprise a metal rod having one end portion sharpened to a point as indicated at 2 and its other end portion 3 of plain cylindrical or like surface area for reception in a conventional chuck 4 fixed to a driven shaft 5. The shaft 5 may be driven by any suitable portable driving means such as an electric motor as, for instance, contained in a standard electric drill as indicated at 6.

Fixed to the shank 1 adjacent its end portion 2 are a plurality (two as shown) of teeth or tines 7 as by means of crossarms 8. As shown, each tine is disposed between planes which are parallel to and spaced radially outwardly from the axis of the shank. Moreover, each tine is inclined to the axis of shank at an angle which is preferably 20° to 25° (about 23° as shown) with respect to such axis. The shank has a continuous single direction of rotation as indicated by the arrow and the tines are inclined rearwardly of such direction of rotation.

The free ends of tines lie in a plane which is spaced from a parallel plane in which the end of end portion 2 lies whereby such end portion is free to enter the soil body as indicated at 9 with the ends of tines in engagement with the surface area of the soil body.

Preferably, the portion of the shank lying between the tines has a tapered sleeve 10 fixed thereto, the taper of the sleeve being of gradually increasing diameter from the end portion 2.

In operation, with the device mounted in the chuck 4, the end portion 2 is driven into the soil and the driving means 6 actuated to impart rotation to the shank. The tines 7 thus revolve rapidly in one direction and their engagement with the soil performs a cultivating action.

An important feature of the invention resides in the described inclination of the tines rearwardly of their direction of revolution. Thus, the inclined leading edges 11 of the tines cut into the soil at an angle to break up the soil without substantial displacement thereof and without imparting excessive strain on the tines, shank and driving means.

Rapid revolution of the tines effectively breaks up soil, even of hard dry clay nature, and also comminutes weeds and root systems engaged thereby.

The crossarms 8 preferably have a maximum cross-sectional dimension which will not provide any effective resistance to entrance into the soil body. Thus, such dimension should not exceed, say, one-half inch, and may be no larger than one-quarter inch. As a result, the tines and crossarms may enter the soil body and dig thereinto to any desired depth. For practical purposes, the tines and cross arms may comprise an integral rod of circular cross-section.

The tapered portion 10 of the shank tends to avoid entanglement therewith of stringy weeds and roots and facilitates removal therefrom of any such weeds and roots.

Since the path of revolution of the tines may be accurately determined, the area to be cultivated may be precisely chosen whereby damage to plants is avoided.

While dimensions of the tool may vary widely, those given below by way of example, are satisfactory:

| | |
|---|---|
| Shank diameter | ¼" |
| Shank length | 26" |
| Tine length | 1½" |
| Tine radius (from axis of shank) | 1" |
| Tine and crossarm diameter | 3/16" |
| Tine angle (to vertical) | 23° |
| Distance between planes of tine ends and shank end | 1½" |

A feature of the invention resides in the fact that the tines are of relatively small length and have a very small diameter of path of revolution. This is quite important in effective eradication of weeds as well as making the tool suitable for high speed revolution. With a diameter of revolution of, say 2 inches, the action of the tool may be concentrated upon a small area containing a weed which may be eradicated in a few seconds. Preferably, the diameter of the path of revolution will not be less than approximately 1½ inches nor more than approximately 4 inches.

I claim:

1. A cultivating tool comprising a shank having at one end thereof a free chuck-receiving portion and at the other end thereof a free soil-engageable portion, a pair of arms fixed to said shank in spaced adjacent relation to said soil-engageable portion and extending radially from said shank, a tine fixed to and depending from the outer end of each said arm, each said tine having parallel inner and outer edges throughout the length of each tine, each of said edges lying in a separate plane parallel to a plane perpendicular to said arms and passing through the axis of said shank, each said tine having a free soil-engageable end disposed in a common plane normal to and intersecting the axis of said shank at a point spaced from said soil-engageable portion of said shank, each said tine having a straight leading edge between said inner edge and said outer edge extending throughout the entire length thereof, each said leading edge being inclined at an acute angle to a plane passing through said pair of arms and the axis of said shank, said last mentioned plane being normal to the plane that is perpendicular to said arms and passes through the axis of said shank, said tines being in uniformly radially spaced relation to said shank, said shank having a frusto-conical portion extending solely from said common plane of said soil-engageable ends of said tines to the juncture of said arms with said shank, said frusto-conical portion being of gradually increasing diameter from said last mentioned plane.

2. A cultivating tool as defined in claim 1, said soil-engageable ends of said tines lying wholly within a circular path having a diameter of 1½ to 2 inches.

References Cited in the file of this patent

UNITED STATES PATENTS

| | | |
|---|---|---|
| 2,251,587 | Gagner | Aug. 5, 1941 |
| 2,574,237 | Barrow | Nov. 6, 1951 |
| 2,779,259 | Kelsey | Jan. 29, 1957 |
| 2,791,879 | Truran | May 14, 1957 |

FOREIGN PATENTS

| | | |
|---|---|---|
| 605,940 | Great Britain | Aug. 4, 1948 |
| 176,834 | Switzerland | July 16, 1935 |